E. C. DICEY.
Machines for Turning Logs.
No. 5,187. Reissued Dec. 17, 1872.
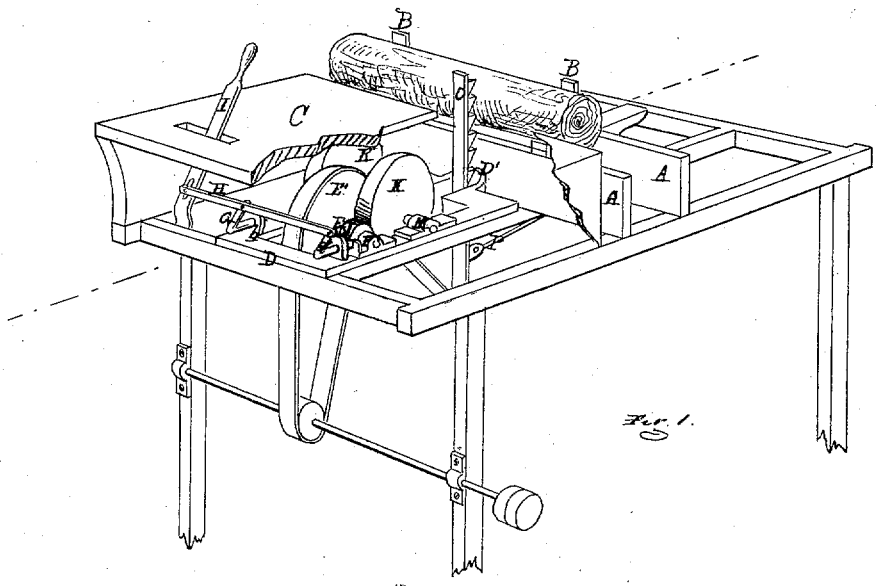
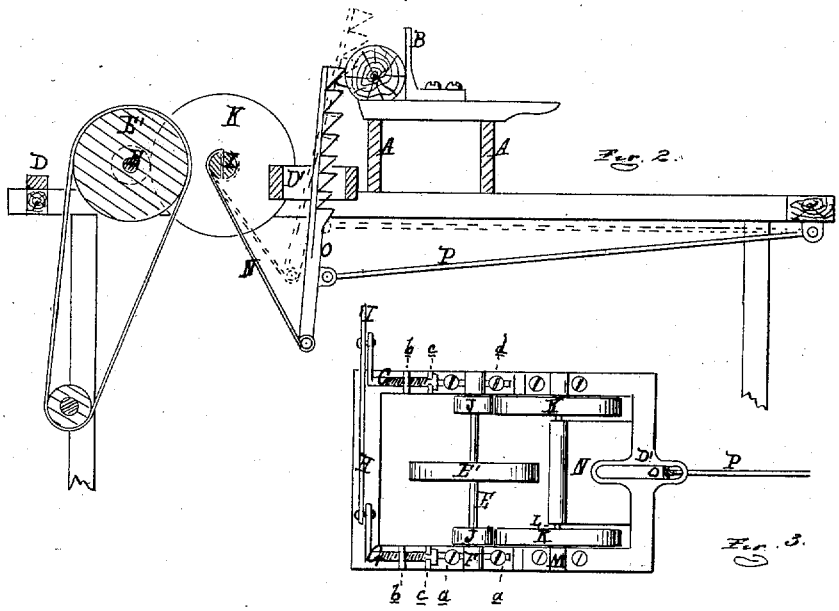
ATTEST:
Geo. Snow
Chas. J. Hunt
INVENTOR:
E. C. Dicey
per Atty
Thos. S. Sprague
AM. PHOTO-LITHOGRAPHIC CO. N.Y. (OSBORNE'S PROCESS.)

UNITED STATES PATENT OFFICE.

ELMER C. DICEY, OF WHITEHALL, MICHIGAN.

IMPROVEMENT IN MACHINES FOR TURNING LOGS.

Specification forming part of Letters Patent No. 130,904, dated August 27, 1872; reissue No. 5,187, dated December 17, 1872.

*To all whom it may concern:*

Be it known that I, ELMER C. DICEY, of Whitehall, in the county of Muskegon and State of Michigan, have invented a new and useful Improvement in Machines for Turning Logs; and I do declare that the following is a true and accurate description thereof, reference being had to the accompanying drawing and to the letters of reference marked thereon and being a part of this specification, in which—

Figure 1 is a perspective view of my device in a mill; Fig. 2 is a cross-section on the line *x x* in Figs. 1 and 3; and Fig. 3 is a plan of the frame in which the shafts are journaled.

Like letters refer to like parts in each figure.

This invention relates to an improvement in machinery for turning logs on the carriage in saw-mills, whereby the log is more readily handled, and all liability of the rack-bar to slip is obviated. It consists in providing the drum-shaft with and rotating it by a double friction-gear, and in the means employed to move the loose boxes of the driving-shaft for throwing the friction-drivers into contact with the friction-gears, all as more fully hereinafter set forth.

In the drawing, A represents the saw-carriage, and B B the knees. C is the mill-floor, and below it is the usual frame-work. D is a metallic frame, securely bolted to the frame-work under the floor on the "saw" side of the carriage. E is the driving-shaft journaled in boxes F, which are so secured to the frame by bolts *a* passing through slots in them that they may have a longitudinal movement, carrying the shaft, bodily, toward or away from the saw. E′ is a driving-pulley keyed on the shaft E about midway of its length, and is continuously rotated by a belt from any convenient pulley in the mill. G are crank-screws tapped through studs *b* at the sides of the frame D, and their extremities are annularly recessed to engage with recessed collars *c* at the back ends of the journal-boxes F, so that the rotation of the screws will move the boxes on the frame. The cranks of the screws are connected by a rod, H, which also connects them with a shipper-lever, I, pivoted at its lower end to some part of the mill-frame, and whose upper end projects above the floor through a slot therein, by which the sawyer can move the boxes in unison. J J are friction-wheels keyed on the driving-shaft, one near each end, and K K are friction-pinions keyed on the shaft L, journaled in boxes M M in the frame parallel with the driving-shaft. This shaft L is so placed with relation to the driving-shaft that a partial rotation of the screws will move the boxes of the driving-shaft enough to force the perimeters of the friction-wheels into contact with the perimeters of the friction-pinions, and thus revolve the latter; or a reverse motion of the screws will withdraw them. N is a wide leather or rubber belt, one end of which is secured to the shaft L about midway of its length, while the other end is secured to the lower end of the serrated rack-bar O, whose upper end plays through an opening in the floor, and also through an elliptic opening, D′, in the frame D, below it and directly under the side of the carriage which is next the saw. To the rack-bar, near or toward its lower end, is pivoted one end of a long radius arm, P, whose other end is pivoted to the floor-joists or some part of the mill-frame.

The belt N not being coiled or wound on the shaft L, it will allow the rack-bar to drop down until its upper end is just below the mill-floor. Now, if the sawyer desires to turn the log on the carriage, he will throw the shipper-lever I to the position shown in Fig. 1, which will bring the friction-wheels into contact with the friction-pinions to revolve the shaft L, and wind upon it the belt N and raise the rack-bar, the commencement of which is shown in Figs. 1 and 2. The radius arm P serves as a fulcrum, and, as the lower end of the rack-bar is pulled away from it as it is raised up, it follows that the bar must incline toward the log and follow it around, as it were, in turning, keeping its serrations dug into the timber, and gives the log a tendency to revolve on its axis. This arrangement precludes all possibility of the slipping of the bar from the log.

I am aware that such a rack-bar as is here shown has before been used for a like purpose, but not in like manner, it having only a movement in a vertical plane.

The advantage of the double friction-gears lies in the fact that there is no torsional strain thrown on the shaft, and that the labor is divided between the gears, lessening their tendency to slip, while the means employed to insure contact cannot fail to produce it. When thrown out of gear the rack-bar will drop of its own weight and unwind the belt from the shaft by revolving the latter in a reverse direction.

I am aware of the device for a similar purpose patented by John Torrent, of Muskegon, Michigan, on the 11th day of July, 1871, and disclaim any part or lot in that invention.

What I claim as my invention, and desire to secure by Letters Patent, is—

1. The radius bar P, pivoted to the rack-bar O, in combination with the belt N and shaft L, said rack-bar operating substantially in the manner and for the purpose set forth.

2. The means for actuating the driving-shaft E in forcing it into contact with the shaft L, consisting of the friction-pinions K, friction-wheels J, sliding boxes F, crank-screws G, connected together by the rod H, and by the same rod to a shifter-lever, I, substantially as described and shown.

ELMER C. DICEY.

Witnesses:
THOS. S. SPRAGUE,
H. S. SPRAGUE.